UNITED STATES PATENT OFFICE.

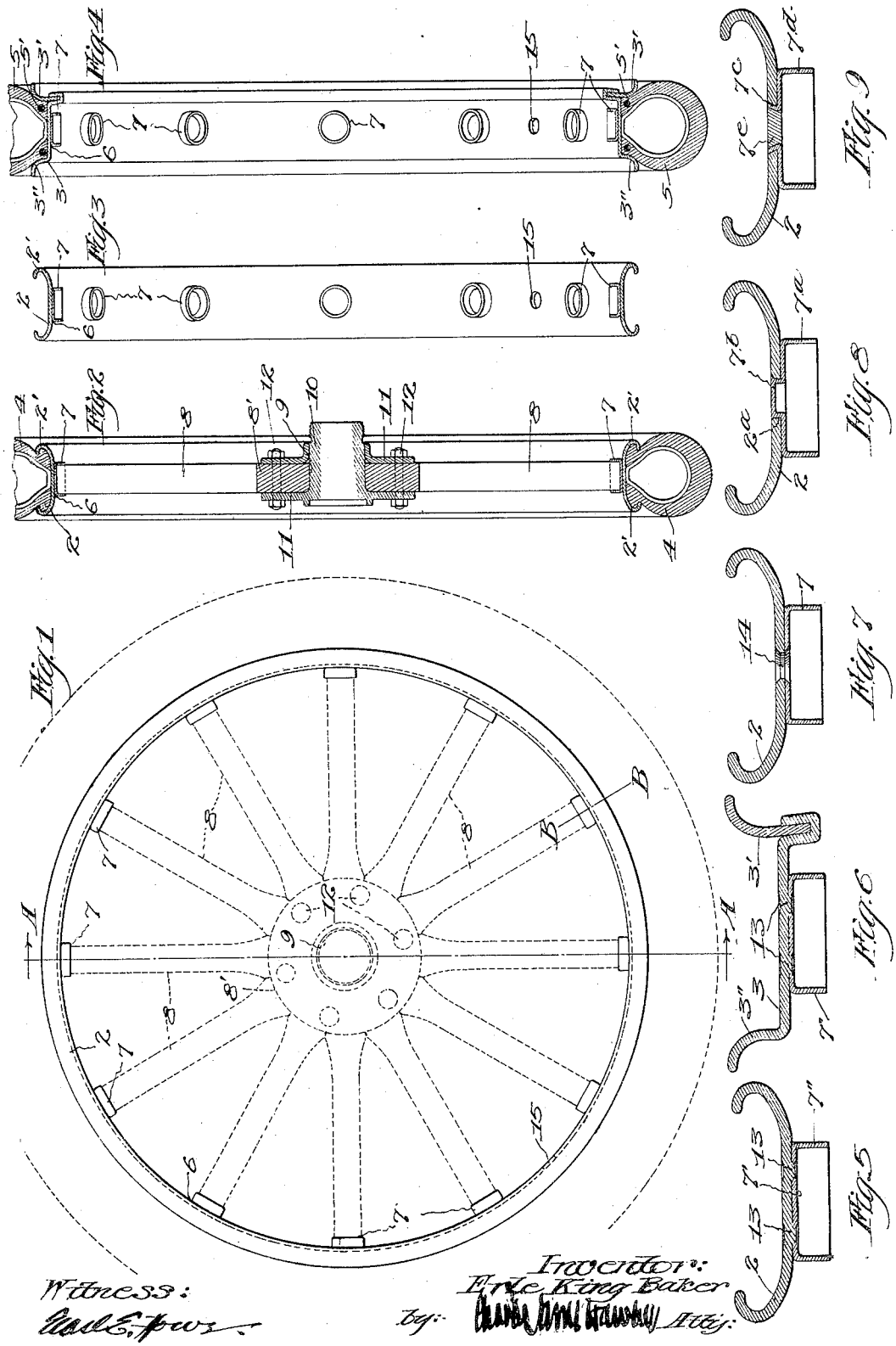

ERLE KING BAKER, OF CHICAGO, ILLINOIS, ASSIGNOR TO BAKER WHEEL & RIM COMPANY, OF CHICAGO, ILLINOIS, A CORPORATION OF ILLINOIS.

SEMIWOOD WHEEL FOR USE WITH PNEUMATIC TIRES.

1,324,293.      Specification of Letters Patent.      Patented Dec. 9, 1919.

Application filed April 25, 1918. Serial No. 230,653.

*To all whom it may concern:*

Be it known that I, ERLE K. BAKER, a citizen of the United States, and a resident of Chicago, county of Cook, and State of Illinois, have invented new and useful Improvements in Automobile-Wheels, entitled Semiwood Wheels for Use with Pneumatic Tires, of which the following is a specification.

My invention relates to improvements in automobile wheels of the kind equipped with pneumatic tires.

The object of my invention is to simplify the construction of such wheels; to lessen the weight, and especially the peripheral weight thereof;—and, to reduce their cost, all without sacrifice of strength, durability or appearance.

I accomplish these objects chiefly through the elimination of unnecessary parts;—for as will appear hereinafter, I dispense with the customary wooden felly, also with the mortising and tenoning of felly and spokes, and with all felly bolts and clips; all of which I find objectionable on account of the weight which they add at the periphery of the wheel, and which represent a large part of the cost of ordinary wooden automobile wheels.

In carrying out my invention I take advantage of a condition which is characteristically present in a pneumatic-tired automobile wheel, and which does not exist in a wheel that has a metal tire or which has a solid rubber tire. I here speak of the fact that a wheel which is encircled by an inflated pneumatic tire is therein held in a state of suspension, with the result that road shocks and blows are not directly communicated from the ground to the hub, but instead are distributed with substantial uniformity throughout the periphery of the wheel. From this I have deduced the conclusion, borne out by experience with wire wheels, that the only real requirement of the periphery or rim of an automobile wheel is that it shall be capable of holding the pneumatic tire in an inflated state and, while doing so, shall serve as a reliable connection between the base of the tire and the wooden spokes that radiate from the hub.

In consonance with this conception, I have invented an automobile wheel that is fully as strong as the wheels now in use, which is of less over-all weight, which is of a minimum peripheral weight; which may be manufactured more rapidly, and at less cost than wooden wheels of the present type;—and wherein I retain all of the well-known advantages of wooden spokes, as compared with the metal spokes which have been offered as substitutes; and incidentally, I entirely dispense with the usual heavy and expensive felly.

My invention resides in an automobile wheel, comprising a suitably flanged pneumatic-tire-holding metal rim which is endless, and which has fixed upon its inner periphery a plurality of circumferentially spaced spoke-end fastenings made of metal and adapted to receive and hold the ends of the wooden spokes;—this alone, and in combination, with wooden spokes radiating from the wheel center and having their ends held in respective fastenings upon said inner periphery of the metal rim.

My invention will be readily understood on reference to the accompanying drawings that form part of this specification and in which: Figure 1 is a side elevation of an automobile wheel embodying my invention, the wooden spokes thereof being shown in dotted lines to better disclose the nature of the wheel-and-tire rim that forms the periphery of the wheel;—Fig. 2 is a section on the line A—A of Fig. 1, showing the wooden spokes and the metal hub in place.;—Fig. 3 is a similar section with the spokes and hub omitted;—Fig. 4 illustrates the endless metal rim in a form which adapts it for use with quick detachable tires;—Figs. 5, 6, 7, 8 and 9 are enlarged sectional details as upon the line B—B of Fig. 1 showing the several ways in which I may secure the spoke-end fastenings to the inner periphery of the endless metal rim.

In the manufacture of my wheels I begin with a solid or endless metal rim, which may be of the clencher type, 2, shown in Figs. 2, 3, 5, 7, 8 and 9, or may be of the quick detachable type, 3 having a detachable side flange 3' as shown in Figs. 4 and 6;—according to the kind of tire, 4, or 5, which is to be used on the wheel. The tire, 4, is of the ordinary soft bead clencher type adapted to be stretched over the integral clencher flange 2', of the clencher rim, 2. The tire, 5, is of the Q. D. type, distinguished by non-extensible base beads, 5', that necessitate the employment of a detachable side flange, 3'. It will be understood that the flanges, 3", and, 3', of the rim, 3, may be of the clencher form where the Q. D. tire has clencher base beads. Ordinarily the Q. D. base beads are of the straight-side type and for this reason only the Q. D. straight side tire is shown in the drawings.

The clencher rim, 2, and the Q. D. rim, 3, have a common characteristic, in that each presents an inner periphery, 6, which is cylindrical. This inner periphery is the base to which I secure the spoke-ends by means of the fastenings, 7. The parts, 7, are stamped metal cups. These are spaced at equal distances upon the inner periphery, 6, of the metal rim. They are permanently fastened thereto and constitute the spoke-end fastenings or seats before mentioned, there being as many of these cups or fastenings as there are wooden spokes, 8, to be accommodated. Preferably, each cup comprises a bottom, 7', and an annular flange, 7", that extends radially toward the center of the wheel.

The spokes, 8, have wedge-shaped butts, 8', which together constitute the wheel center and contain the hub-hole, 9. The latter accommodates the hub, 10. Whatever the form of the hub, it is provided with hub-flanges, 11, between which the spokes are clamped by means of a plurality of bolts or rivets, 12; completing a firm connection between the metal hub, 10, and the group of resilient wooden spokes, 8, which radiate therefrom. As clearly shown, the outer end of each spoke is seated and held within one of the fastenings or cups, 7, the end of the spoke in each case bearing against the bottom, 7', of the cup.

As the spoke ends cannot escape from the shallow cups, 7, without actually shearing the end of the wooden spoke or shearing the metal flange of the cup, it is obvious that the cups may be even shallower than herein indicated without lessening the serviceability and durability of the wheel. It is preferable that they shall be shallow, as deeper cups would considerably interfere with the easy and safe assembling of the rim and spokes.

Obviously it is essential that the metal cups or fastenings, 7, shall be reliably secured to the flanged metal rim, otherwise the working strains and stresses between the rim and the spokes would dislodge the metal fastenings from the rim. Therefore, I have indicated several ways in which the metal cups may be permanently and rigidly secured to the flanged metal rim. In Figs. 5 and 6 I have illustrated the metal cup as being attached to the metal rim by a welding process, as indicated by the weld spots, 12. In Fig. 7 the metal cup or spoke seat, 7, is shown to be secured to the rim by a short, strong metal rivet, 14, of a large diameter. Fig. 8 illustrates a metal cup, 7ª, having an integral central rivet portion, 7ᵇ, formed in the process of pressing or stamping the cup, 7ª, and which having been inserted in the hole, 2ª, of the rim is swaged and expanded therein to form a permanent fastening. Fig. 9 differs from Fig. 8 in that the integral top flange, 7ᶜ, of the cup, 7ᵈ, provides a hole which receives a separate swaging rivet, 7ᵉ, which construction provides a reliable connection between the spoke fastening and the metal rim.

In every case the metal rim is provided with a valve stem hole, 15, for the reception of the valve stem of the pneumatic tire.

I am able to manufacture these wheels very expeditiously and cheaply, as follows: Initially, the rim (2 or 3) is made a fraction of an inch over-size in circumference. The metal spoke-end fastenings, 7, are then secured to the inner periphery of the rim, as described. All of the spokes, 8, are then placed in position, the over-size of the rim permitting the wedge-shaped butts thereof to be easily and accurately positioned with respect to one another at the center of the wheel. The then loosely assembled wheel is placed in a machine, similar to a well-known tire setting machine, and thereby the rim is forcibly compressed and caused to shrink to the predetermined correct circumferential measurement. Thus all of the spokes are simultaneously forced inwardly and the wedge-shaped or mitered butts are left in firm contact one with the other. Thereafter the wooden hub center is trimmed and finished in the usual manner; which completes the process of manufacturing the wheel.

One of the special advantages of this method of manufacturing is that a truly circular and evenly tensioned wheel is produced. A further advantage of my wheel is that when placed in use with a pneumatic tire the metal rim constantly tends to shrink to a further degree, from which it follows that a wheel of this construction has a distinctly self-tightening operation.

Other methods of assembly may be employed, but do not as certainly yield all the desired advantages.

Having thus described my invention, I claim as new and desire to secure by Letters Patent:—

The improvement in the art of making automobile wheels which consists in making an endless metal rim having spaced spoke-end holders and of a flanged cross section, suited to a pneumatic tire of given size but of an oversize circumferentially with respect thereto, making wooden spokes having mitered butts and of a length that will permit a full radial complement thereof to be loosely assembled with their outer ends in said holders and with their mitered butts in mutually coöperative relation in a single spoke plane, so assembling a full complement of said spokes within said rim, circumferentially upsetting said flanged rim and thus driving the spokes inward until their mitered butts mutually form a compact hub center and the rim is reduced to a predetermined circumference suited to the given tire, and finally finishing said compact hub center with a hub hole which will admit a complete complementary metal hub without radial disturbance of said butts.

In testimony whereof, I have hereunto set my hand this 22d day of April, 1918.

ERLE KING BAKER.